July 3, 1934. F. BARTLING 1,965,445
METHOD OF PRODUCING SODIUM CARBONATE AND AMMONIUM CHLORIDE
Filed May 12, 1931
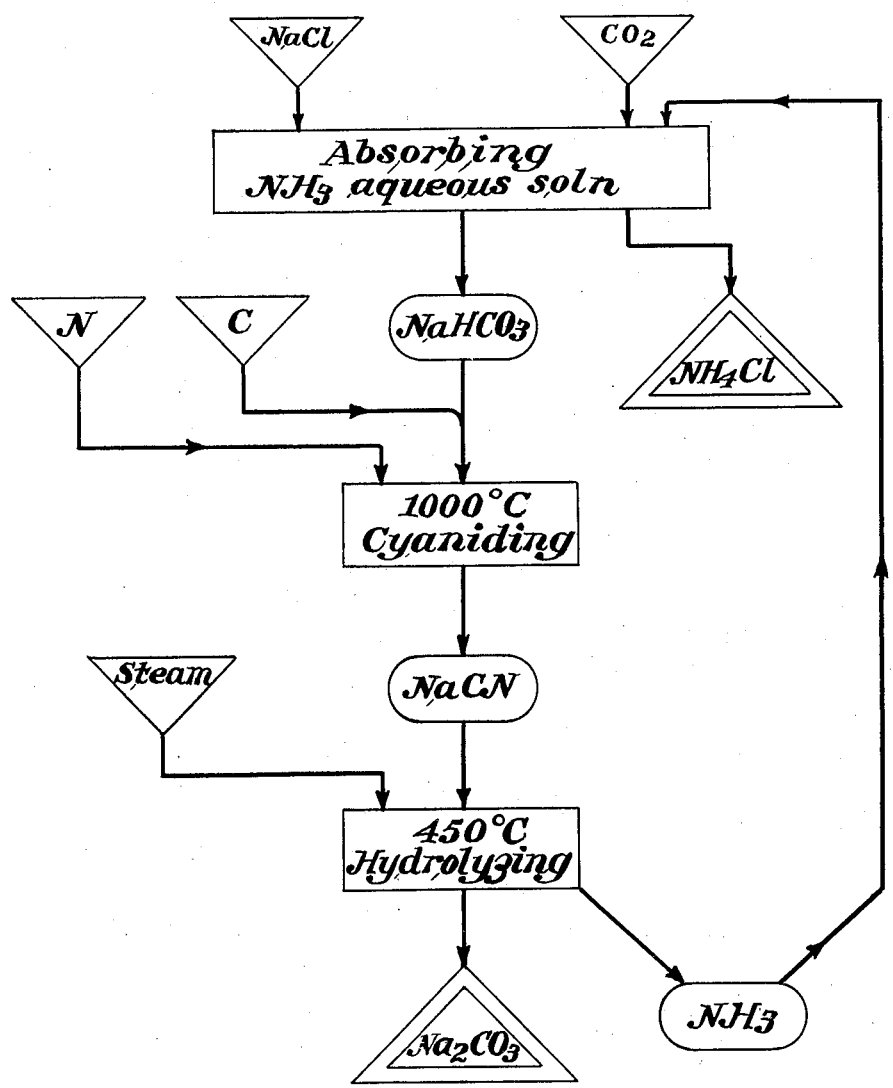
Inventor:
Friedrich Bartling,
By Attorneys.

Patented July 3, 1934

1,965,445

UNITED STATES PATENT OFFICE 1,965,445

METHOD OF PRODUCING SODIUM CARBONATE AND AMMONIUM CHLORIDE

Friedrich Bartling, Huglfing, Germany; Jenny Bartling, legal representative of said Friedrich Bartling, deceased, assignor to Alterum Kredit-Aktien-Gesellschaft, Berlin, Germany Application May 12, 1931, Serial No. 536,931
In Germany May 20, 1930

1 Claim. (Cl. 23—63)

This invention relates to the production of sodium carbonate and ammonium chloride.

It is based upon the idea of combining the well known ammonia-soda process with the likewise known methods of cyanizing alkali bicarbonates and saponifying the corresponding cyanides.

Accordingly the subject of the invention is a method of manufacturing sodium carbonate and ammonium chloride which consists in transforming the solid sodium bicarbonate formed in carrying out the ammonia-soda process in admixture with carbon into sodium cyanide by the action of nitrogen, the sodium cyanide being decomposed by treatment with steam to form sodium carbonate and the ammonia formed simultaneously being introduced into the ammonia-soda process and obtained as ammonium chloride.

It is possible by means of this process to arrive at the stated final products in a technologically unitary process of operation, with the use of common salt, carbon dioxide, carbon and nitrogen, as well as steam, while the ammonia is obtained in an associated absorption phase.

These advantages distinguish the new method particularly from a previously known method by Caro, which also serves for obtaining sodium carbonate (ammonia-soda) and wherein the ammonia-soda process is carried out with production of solid sal ammoniac from ammonia obtained in the secondary action by the decomposition of lime nitrogen.

For the rest the patentable idea of the invention merely resides in the combination as such, whilst the individual phases of operation proceed in known manner.

The manner in which the new method is carried out is particularly shown by the following example, and is illustrated by the flow sheet on the accompanying drawing.

According to the known ammonia-soda method carbon dioxide is introduced into an ammoniacal solution of common salt. The reaction proceeds according to the formula.

The sodium bicarbonate precipitated is separated from the residual ammonium chloride liquor by filtration or the like and solid ammonium chloride is obtained from the ammonium chloride liquor by any known method.

The sodium bicarbonate is now treated with nitrogen in admixture with carbon at high temperature, whereby sodium cyanide is formed. This reaction may be illustrated by the following equation:

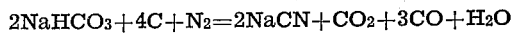

By a separate treatment of the sodium cyanide with steam, predominately carried out at about 380 to 450° C., the sodium cyanide is decomposed or hydrolyzed into sodium carbonate and ammonia according to the equation:

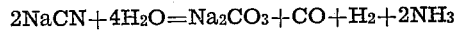

The ammonia obtained in this manner may be used together with fresh common salt to form a new ammoniacal common salt solution from which sodium carbonate and ammonium chloride are once more obtained by repeating the described process.

I claim:

The method of continuously preparing sodium carbonate and ammonium chloride from sodium chloride, which comprises reacting ammonia with sodium chloride solution in the presence of carbon dioxide whereby to obtain sodium bicarbonate and ammonium chloride, withdrawing ammonium chloride from the obtained product, cyaniding the sodium bicarbonate in the presence of carbon and nitrogen to obtain sodium cyanide, hydrolyzing the sodium cyanide with steam to obtain sodium carbonate and ammonia, withdrawing the sodium carbonate from the hydrolysis product, and returning the ammonia into contact with further quantities of sodium chloride solution and carbon dioxide.

FRIEDRICH BARTLING.